United States Patent

Hankley

[15] 3,646,422
[45] Feb. 29, 1972

[54] CIRCUIT FOR RECHARGING THE BATTERY OF A PORTABLE DEVICE FROM THE CHARGING SYSTEM OF A CAR

[72] Inventor: Max E. Hankley, Anderson, Ind.
[73] Assignee: General Motors Corporation, Detroit, Mich.
[22] Filed: Aug. 20, 1970
[21] Appl. No.: 65,623

[52] U.S. Cl. ................................320/53, 307/10, 320/15, 320/59, 320/61
[51] Int. Cl. ..................................................H02j 7/04
[58] Field of Search.....................307/10, 318; 320/2, 3, 6, 7, 320/11, 12, 15, 16, 17, 40, 51, 53, 56, 57, 59, 61; 322/28

[56] References Cited

UNITED STATES PATENTS

| | | | |
|---|---|---|---|
| 3,086,160 | 4/1963 | Loftus | 320/51 X |
| 3,467,854 | 9/1969 | Harland, Jr. et al. | 322/28 |
| 3,090,871 | 5/1963 | Gorman | 320/15 X |
| 2,813,265 | 11/1957 | Finks | 320/2 X |
| 3,108,192 | 10/1963 | Reich | 320/6 X |
| 3,312,889 | 4/1967 | Gold | 320/40 X |

Primary Examiner—William M Shoop, Jr.
Attorney—E. W. Christen, Albert F. Duke and C. R. Meland

[57] ABSTRACT

A first Zener diode connected from the positive terminal of a rechargeable battery for a portable electrical device to the output of a vehicle charging system and a second Zener diode connected across the terminals of the rechargeable battery. The first Zener breaks down when the output of the vehicle charging system is above the sum of the terminal voltage of the rechargeable battery and the breakdown voltage of the first Zener, and the second Zener breaks down when the output is above the sum of fully charged terminal voltage of the rechargeable battery and the breakdown voltage of the first Zener.

3 Claims, 1 Drawing Figure

PATENTED FEB 29 1972 3,646,422
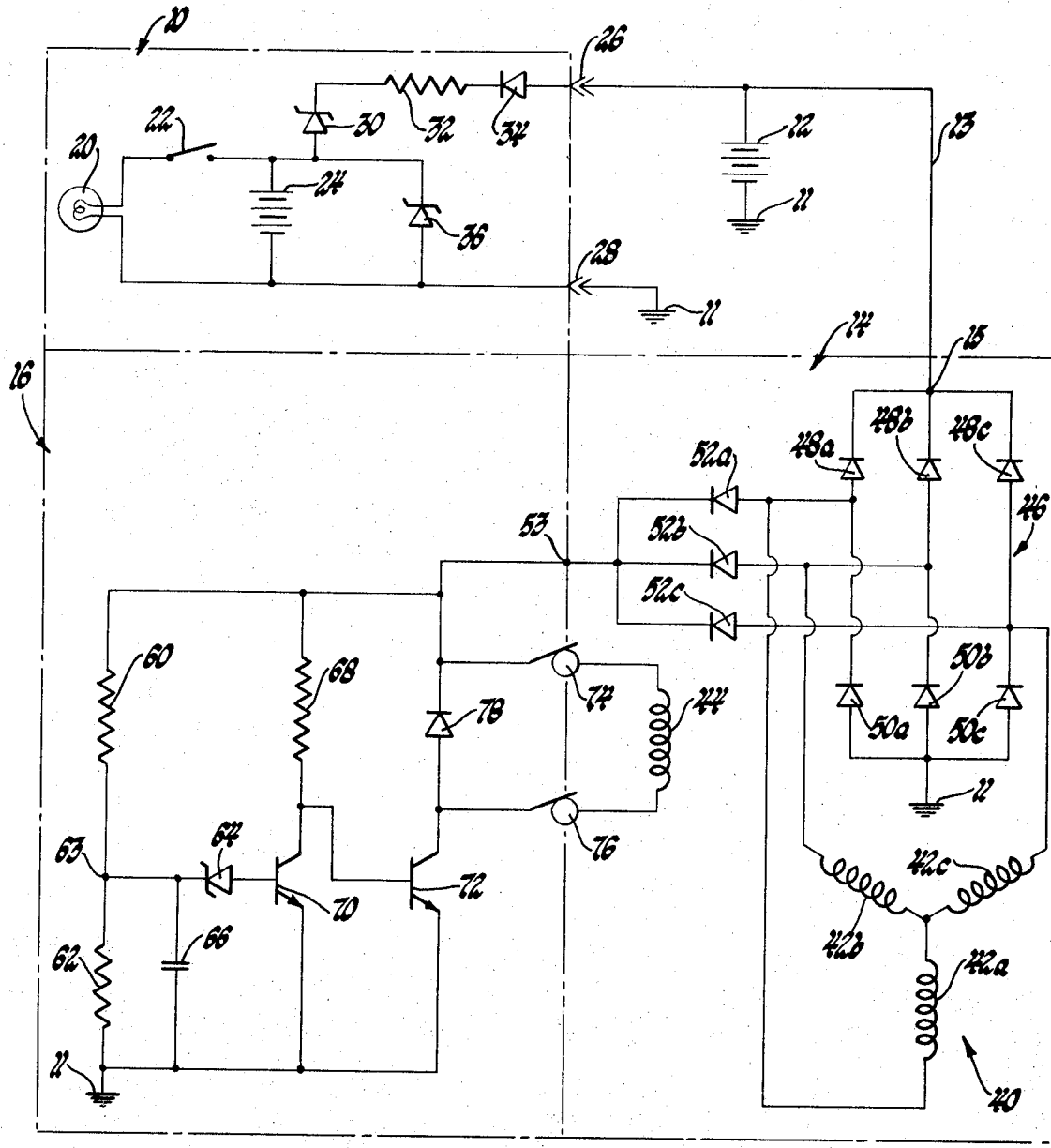
INVENTOR.
Max E. Hankley
BY
Albert F. Duke
ATTORNEY

CIRCUIT FOR RECHARGING THE BATTERY OF A PORTABLE DEVICE FROM THE CHARGING SYSTEM OF A CAR

This invention relates to a circuit for removably connecting a rechargeable battery for a portable accessory to and recharging it from the output of a vehicle charging system.

The output of a typical passenger car charging system is about 13.5 volts for a 12 volt battery, and the terminal voltage of a battery for a portable accessory such as a lantern is usually considerably less. For example, a lantern may be energized by a 6 volt battery that may have a terminal voltage of 5 volts when substantially discharged and a terminal voltage of up to 6.8 volts when being recharged. Because of the difference between the output of the vehicle charging system and the varying terminal voltages of the rechargeable battery, provision must be made to prevent overcharge of the accessory battery from either the terminal voltage of the vehicle battery when the charging system is not operating or from the full output voltage of the charging system when it is operating. In either instance, continuous charging current could boil off the electrolyte in the accessory battery and ultimately destroy it.

It is therefore a primary object of the present invention to provide a circuit for recharging the battery of a portable accessory from the charging system of a motor vehicle where said circuit prevents the rechargeable battery from being overcharged.

It is another object of the present invention to provide a circuit for recharging the battery of a portable accessory from the output of a vehicle charging system where the circuit prevents overcharge of the rechargeable battery, has terminals allowing removable connection to the charging system and prevents inadvertent discharge of the rechargeable battery through its terminals.

Overcharge of the rechargeable battery is prevented in the present invention by a recharging circuit in which a first Zener is connected in series with the rechargeable battery and a second Zener is connected in parallel with the battery. The first Zener blocks current from the vehicle battery to the rechargeable battery unless the latter is substantially discharged. When the rechargeable battery is fully charged, the second Zener breaks down together with the first to prevent overcharge when the charging system connected to the vehicle battery produces an output. Inadvertent discharge of the rechargeable battery across terminals of the recharging circuit is prevented by a diode connected in series with the first Zener, and a ballast resistor connected in series between the first Zener and the diode limits the current to the recharging circuit.

These and other details of the present invention will be presented in the following description taken in conjunction with the drawing wherein the recharging circuit of the present invention is shown connected to the output of a charging system for a vehicle.

As may be better seen with reference to the FIGURE portable electrical accessory 10 is connected to vehicle battery 12 the negative terminal of which is connected to ground 11. The positive terminal of vehicle battery 12 is connected by conductor 13 to vehicle charging system 14, the output of which at terminal 15 is controlled by regulator 16.

Portable accessory 10 is here comprised of a lantern of known design having a lamp 20 connected by the switch 22 to the positive terminal of a rechargeable battery 24. For recharging battery 24 from vehicle charging system 14, accessory 10 also includes male and female-type connectors 26 and 28, a first Zener 30, a ballast resistor 32, a diode 34, and a second Zener 36. Diode 34, resistor 32 and Zener 30 comprise a series circuit between connector 26 and the positive terminal of battery 24 through which the latter may be charged from the output of charging system 14 when connected thereto. In this circuit, ballast resistor 32 limits the charging current to battery 24 and diode 34 prevents the inadvertent discharge of battery 24 when connected in parallel with the other vehicle accessories or when connectors 26 and 28 are shorted.

Battery 24 may be such as described in U.S. Pat. application, Ser. No. 785,524, entitled "Spill Proof Battery," filed by Ralph L. Corbin and Richard A. Jones on Dec. 20, 1968, and assigned to the assignee of the present application. In the present embodiment battery 24 has terminal voltages ranging from 5.7 to 6.2 volts when energizing lamp 20, and when being recharged has terminal voltages up to and slightly above 6.8 volts.

Zener 30 has a breakdown voltage, here 6.3 volts, selected to provide, when added to the terminal voltage of battery 24, a voltage that is greater than the fully charged terminal voltage of battery 12. Zener 30 thereby prevents any charge to battery 24 from battery 12 when there is no output from alternator 14. However, the output from alternator 14 when operating is usually higher than the terminal voltage of battery 12 by an amount sufficient to break down Zener 30 regardless if battery 24 is fully charged or not. If not fully charged, battery 24 therefore charges from alternator 14 until attaining a predetermined terminal voltage, here 6.8 volts, which if exceeded continuously could overcharge the battery. To prevent such overcharge by shunting the charging current, a Zener 36 is connected across the battery and is selected to have a breakdown voltage at the predetermined terminal voltage.

The charging system for battery 12 may be of known design, here comprised of an alternator 14 having a stator 40, the output windings 42a, 42b, and 42c of which are connected to respective legs of three-phase full wave rectifier 46 and are energized by field coil 44. Rectifier 46 is comprised of positive diodes 48a, 48b, and 48c, negative diodes 50a, 50b, and 50c, and diode trio 52a, 52b, and 52c. The anodes of diodes 50 are grounded and the cathodes are connected to the anodes of positive diodes 48 and to the anodes of diodes 52, the cathodes of which are connected to input terminal 53 of regulator 16. The cathodes of positive diodes 48 are connected to alternator output terminal 15 and therefrom to the positive terminal of battery 12 by conductor 13.

Regulator 16 controls the output of alternator 14 by sampling the voltage from diode trio 52 across resistors 60 and 62 having a node 63 therebetween connected to the cathode of Zener diode 64. When the output of alternator 14 is greater than desired, Zener 64 breaks down to turn on transistor 70 and through its collector to emitter junction ground the base to transistor 72. This turns transistor 72 off and thereby interrupts the flow of current from diode trio 52 through slip ring and brush assembly 74, field coil 44, and a slip and brush ring assembly 76. The energy in the decaying field of coil 44 is discharged through diode 78 connected across the brushes 74 and 76. When the output of the alternator subsequently falls below the desired value, the voltage at node 63 drops to where Zener 64 does not break down, thereby turning off transistor 70. The drop across resistor 68 connected from regulator input terminal 53 to the collector of transistor 70 and to the base of transistor 72 then is sufficient to turn transistor 72 on and allow the field current to flow therethrough. This cycle repeats with capacitor 66 filtering the fluctuations in the alternator output.

Having described one embodiment of the present invention it is understood that the specific terms and examples are employed in a descriptive sense and not for the purpose of limitation. Other embodiments of the invention, modifications thereof, and alternatives thereto may be used. Therefore, I aim in the appended claims to cover such modifications and changes as fall within the true spirit and scope of my invention.

I claim:

1. In a portable electrical device including a load and a switch connected in series across first and second terminals of a first battery rechargeable from the output of a vehicle charging system connected to a terminal of a second battery the fully charged voltage of which is greater than that of said first battery, the combination of:

a. first and second reverse breakdown voltage elements each having an anode and a cathode, said first element having its cathode and anode respectively connected to said first and second terminals of said first battery and having a breakdown voltage greater than the fully charged terminal voltage of said first battery, and said second element having its anode connected to said first terminal of said first battery and having a breakdown voltage greater than the fully charged terminal voltage of said second battery minus the fully charged terminal voltage of said first battery, and;

b. means adapted to removably connect the cathode of said second element to said terminal of said second battery.

2. In a lantern comprised of a lamp and switch therefor connected in series across first and second terminals of a first battery rechargeable by the output of a charging system connected to a terminal of a second battery the fully charged voltage of which is greater than that of said first battery, circuit means for preventing overcharge of said first battery and adapted to removably connect said first battery to said output of said charging system comprising:

a. first and second Zener breakdown diodes each having an anode and a cathode, said first diode having its cathode and anode respectively connected to said first and second terminals of said first battery and having a predetermined breakdown voltage, said second diode having its anode connected to said first terminal of said first battery and having a breakdown voltage greater than the voltage across said second battery when fully charged minus said voltage of said first battery when fully charged, and;

b. a third diode the cathode of which is connected in circuit with said cathode of said second diode and the anode of which is adapted to be removably connected to said terminal of said second battery.

3. In a portable electrical device including a load and a switch connected in series across a first battery which in turn is connectable to a second battery and charging system therefor the fully charged voltage of said first battery being less than that of said second battery, the improvement comprising circuit means for removably connecting said first battery to the output of said second battery and charging system, said circuit means providing a path for charging said first battery and including a first reverse voltage breakdown diode for presenting discharge from said second battery to said first battery in the absence of an output from said charging system, said first diode being connected in series with said first battery and having a breakdown voltage greater than the difference between the fully charged terminal voltages of said first and second batteries; a second reverse voltage breakdown diode for preventing overcharge of said first battery, said second diode connected across said first battery and in series with said first diode and having a breakdown voltage equal to the maximum desired recharging terminal voltage of said first battery; connector means for removably connecting said first diode in series with said output of said second battery and said charging system; and a third diode connected in series between said first diode and said connector means for preventing inadvertent discharge of said first battery when said circuit means are removed from said charging system.

* * * * *